United States Patent

[11] 3,577,132

[72] Inventors Donald E. Anderson;
Lawrence M. Koch; Robert E. Lloyd;
Frank J. Sordello, San Jose, Calif.

[21] Appl. No. 735,137
[22] Filed June 6, 1968
[45] Patented May 4, 1971
[73] Assignee International Business Machines Corporation
Armonk, N.Y.

[54] PHASE LOCKED OSCILLATOR FOR STORAGE APPARATUS
9 Claims, 3 Drawing Figs.

[52] U.S. Cl. .......... 340/174.1A, 346/74M
[51] Int. Cl. .......... G11b 5/44, G11b 19/28, G11b 27/10
[50] Field of Search .......... 340/174.1 (A), 174.1 (B), 174.1 (G), 174.1 (H); 346/74 (M); 179/100.2 (S), 100.2 (T)

[56] References Cited

UNITED STATES PATENTS

| | | | |
|---|---|---|---|
| 2,926,341 | 2/1960 | Scarbrough .......... | 340/174.1 |
| 3,041,585 | 6/1962 | Wolfe, Jr. .......... | 340/174.1 |
| 3,070,800 | 12/1962 | Brown, Jr. et al. .......... | 340/174.1 |
| 3,187,317 | 6/1965 | Smith, Jr. .......... | 340/174.1 |
| 3,441,342 | 4/1969 | Ball et al. .......... | 179/100.2 |

*Primary Examiner*—Bernard Konick
*Assistant Examiner*—Vincent P. Canney
*Attorneys*—Hanifin and Jancin and Nathan N. Kallman

ABSTRACT: A phase-locked oscillator useful for a magnetic storage system receives timing pulses from a means for generating reference pulses connected to a rotary storage medium. Variations in the angular velocity and phase of the rotating storage medium result in corresponding variations of frequency and phase of a voltage-controlled oscillator, which controls the write or record circuitry. During readout, the phase-locked oscillator is employed to locate the selected data records accurately.

*INVENTORS*
DONALD E. ANDERSON
LAWRENCE M. KOCH
ROBERT E. LLOYD
FRANK J. SORDELLO
BY Nathan N. Kallman
ATTORNEY

PHASE LOCKED OSCILLATOR FOR STORAGE APPARATUS

BACKGROUND OF THE INVENTION

1. Field of the Invention

This invention relates to a phase-locked oscillator circuit that may be employed for recording and reproducing data signals from a rotary magnetic medium.

2. Description of the Prior Art

In presently known storage systems that process large amounts of data, it is generally necessary to provide timing signals in order to recover the recorded data. For example, in magnetic disc storage files, such timing signals may be constituted by a separate prerecorded clock track, or by the use of a data code incorporating its own clock, as in double frequency modulation. The use of a separate recorded clock track requires a crystal write oscillator, and a separate read-write magnetic head and associated electronics. Apparently, it would be preferable to operate without the additional magnetic head and separate track just for clocking. Also, the use of codes, such as double frequency modulation, having a built-in clock, places stringent requirements on the readout electronics, particularly when dealing with high frequency and high-density information. There is a tendency for the magnetically processed clock pulses or data pulses to shift when the pattern of pulses, bits or transitions is too crowded or too widely spaced. Therefore sophisticated and expensive circuitry must be used to distinguish between data and clock pulses to achieve an accurate readout and data recovery.

SUMMARY OF THE INVENTION

An object of this invention is to provide a novel and improved phase-locked oscillator system for use in a storage system, such as a magnetic disc file.

Another object of this invention is to provide a phase-locked oscillator that is applicable to both the record and readout modes of a storage system.

Another object of this invention is to provide a circuit that affords recording at a constant bit density on different tracks having different circumferences in a magnetic disc file.

Another object of this invention is to provide a magnetic disc file including a phase-locked oscillator that enables rapid location of a selected record, without the need of address flags.

According to this invention, a data storage apparatus includes a closed loop phase-locked oscillator having a phase discriminator, signal compensation and integrating means, and a voltage-controlled oscillator, inter alia. The phase discriminator receives a pulse signal developed in response to the rotation of the storage medium, which may be a magnetic disc for example. Simultaneously, an output signal from the voltage-controlled oscillator (hereinafter designated the VCO) is applied to the discriminator. A counter serves to divide the output from the VCO by a predetermined number, so that the frequency of the VCO signal fed to the phase discriminator is substantially the same as that of the reference frequency generated by the rotation of the storage medium. The discriminator produces a phase error signal that is used to develop a control voltage, which varies the frequency and phase of the VCO.

During the write mode, the oscillator output is fed to a write drive circuit allowing registration of the data in phase with the output from the oscillator. The nominal VCO frequency relates to the frequency of the data being recorded. During the readout mode, the output from the oscillator is employed to count bits from a home or index position, thus enabling rapid and substantially accurate location of any data bit or group of bits recorded on the storage medium. In effect, the oscillator is correlated with the frequency and phase of rotation of the storage medium to provide an indication of a desired position on a data track at any given instant which may be accessed for recovery of selected data.

BRIEF DESCRIPTION OF THE DRAWINGS

The foregoing and other objects, features and advantages of the invention will be apparent from the following more particular description of a preferred embodiment of the invention, as illustrated in the accompanying drawings.

In the drawings.

DESCRIPTION OF THE PREFERRED EMBODIMENT

Figure 1:
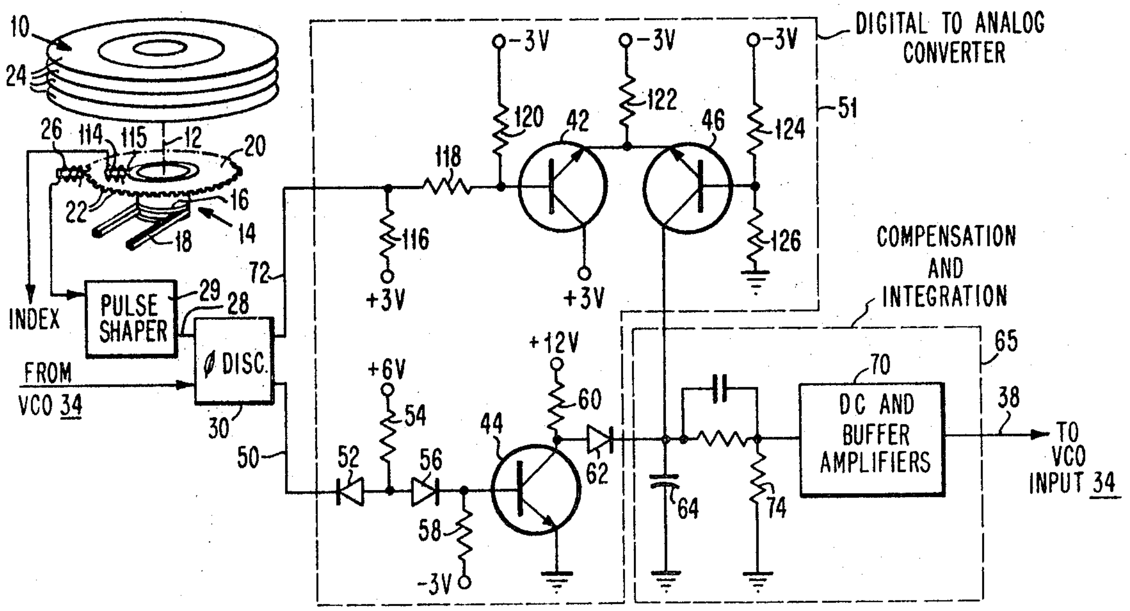
FIG. 1 is a schematic and block diagram of one portion of the phase-locked oscillator of this invention.

With reference to FIG. 1, a disc pack 10 is mounted to a spindle 12 that is rotated by a drive means 14, shown as a pulley 16 and portion of a motor-driven belt 18, by way of representation. A toothed wheel or gear 20, having a predetermined number of uniformly spaced cogs or teeth 22, is also mounted to the spindle 12 to rotate in unison with the magnetic discs 24 of the pack 10. The peripheral cogs 22 of the wheel 20 are made of ferromagnetic material, and are formed with fine narrow ends, which are sensed serially as they traverse a fixed magnetic sensor 26, when the spindle 12 and mounted assemblies 10 and 16 are rotating. Practically, the wheel 20 and cogs 22 are formed as an integral structure from the same ferromagnetic material, which may be steel, by way of example.

Figure 3:
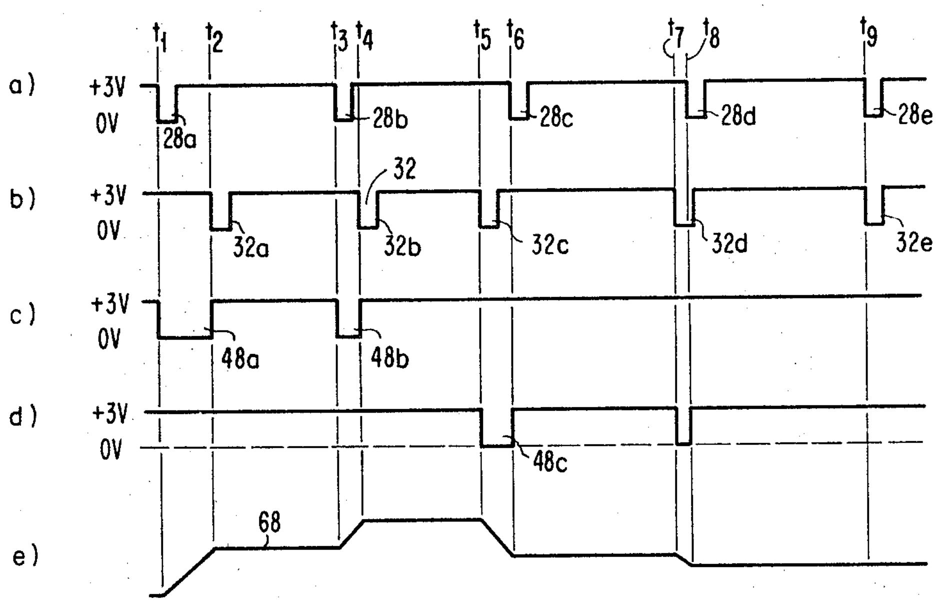
FIG. 3 is a series of waveforms to aid in the explanation of the invention.

In operation, as the cogs 22 pass the sensor 26, an AC waveform is generated and applied to a pulse shaper 29, which changes the AC signal to a sharp pulse 28. The pulse 28 is fed to a phase discriminator 30, and at the same time, a pulse 32 (FIG. 3*b*) is directed from the output of a voltage controlled oscillator 34 (FIG. 2) through a counter-divider circuit 36 to the discriminator 30. The voltage-controlled oscillator (VCO) 34 has a nominal frequency of 6.75 megapulses per second, by way of example. In the present example, the divider circuit 36 reduces the oscillator frequency by a factor of 375 to 18 kilopulses per second, which is the frequency of the reference signal received from the toothed wheel 20 rotating synchronously with the disc pack 10. This referencce frequency of 18 kilopulses per second is achieved, in this particular embodiment, by utilizing 180 uniformly spaced teeth 22 on the wheel 20, and rotating the wheel at 100 r.p.s. (revolutions per second), by way of example.

Figure 2:
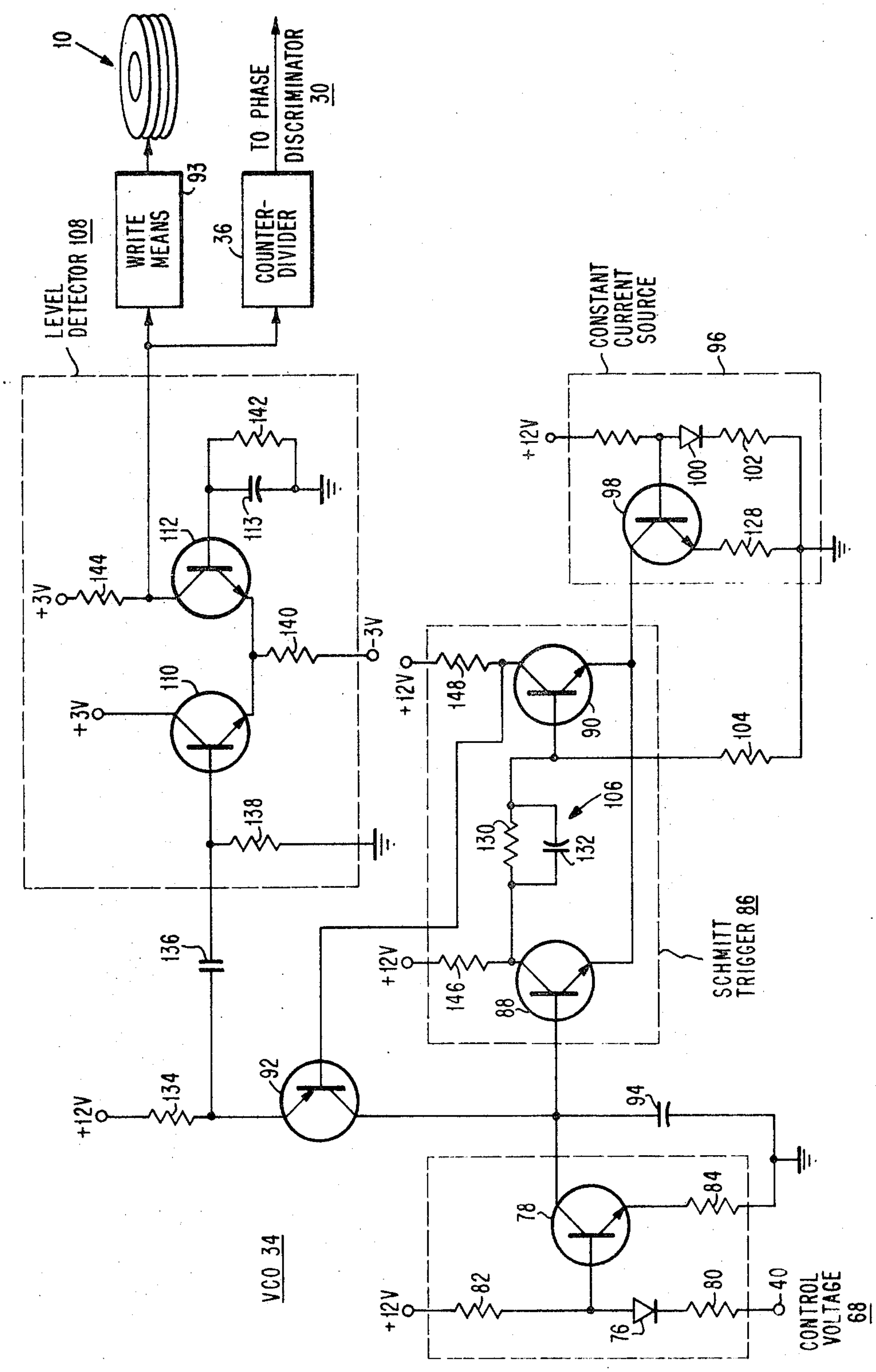
FIG. 2 is a schematic circuit diagram, partly in block, of the other portion of the phase-locked oscillator in accordance with this invention.

At first, let us assume a constant control voltage being applied from the output circuit 38 of FIG. 1 to the VCO 34 of FIG. 2 at input terminal 40. At such time, NPN transistors 42 and 44 of FIG. 1 are conducting, whereas transistor 46 is off. With reference to the timing waveforms of FIG. 3, at time $t_1$, the reference pulse **28*a*** (FIG. 3*a*) arrives prior to the pulse **32*a*** at $t_2$ (FIG. 3*b*) from the VCO 34. The leading edges of pulses **28*a* and 32*a* are used to produce a negative going pulse 48*a*** (FIG. 3*c*), that is directed through lead 50 to the channel of a digital-to-analog converter 51. The pulse **48*a* serves to increase the level of the control voltage to the VCO 34. The time between the pulses 28 and 32, which determines the pulse width of pulse 48*a*, is that time during which the transistor 44 conducts, and during which a capacitor 64 in a compensation and integration circuit 65 is charged. The compensation circuit 65 controls the bandwidth and phase margin, thereby ensuring loop stability of the phase lock oscillator system. To this end, the circuit 65 compensates for any nonuniformity or irregularity in the spacing of the teeth 22** by an averaging effect.

The negative going pulse **48*a* causes the transistor 44 to turn off, and current flows through resistor 60 and diode 62 to charge the capacitor 64. The increased control voltage 68** (FIG. 3*e*) is applied through a DC amplifier and buffer amplifier 70 to the input terminal 40 of the VCO 34.

At time $t_2$ transistor 44 is turned on again, but the control voltage remains constant due to diode 62, which is now biased off. At times $t_3$ and $t_4$, a further increase in the control voltage 68 is developed, because the pulse 32*b* from the VCO 34 appears later than that of the reference pulse 28*b*.

At time $t_5$, the output pulse 32*c* from the VCO 34 arrives earlier than the reference pulse 28*c*, and a pulse 48*c* (FIG. 3*d*) is produced by the phase discriminator 30 and applied through a lead 72 to the channel that effectuates a decrease in the control voltage 68. A decrease in control voltage results in a decrease in frequency of the VCO 34. To effect this decrease, the transistor 42 is turned off by pulse 48*c*, and the transistor 46 is turned on, thus discharging the capacitor 64 in the integrating circuit 65. When the reference pulse 28*c* appears, the capacitor 64 no longer discharges, and transistor 42 becomes conducting while transistor 46 is cut off. During the interval $t_7$—$t_8$, the control voltage provided through the capacitor 64 is further decreased, because the reference pulse 28*d* follows the VCO output pulse 32*d* in time. At time $t_9$, the pulses 28*e* and 32*e* are in coincidence, and there is no change in the control voltage 68.

With reference to FIG. 2, the control voltage 68 is applied to the input terminal 40 connected to a diode 76 and a transistor 78 through a resistor 80. The base of the transistor 78 is tied to a positive potential by a resistor 82, and its emitter is connected to ground by a resistor 84. The output electrode or collector of the transistor 78 is coupled to a Schmitt trigger circuit 86, including NPN transistors 88 and 90. Transistor 90 is normally conducting, while transistor 88 is normally off. When transistor 90 conducts, its collector voltage drops and drives a transistor 92 in the output circuit of transistor 90 into conduction. Current flows from the collector circuit of transistor 92 to charge a capacitor 94, having one plate tied to reference ground. As a result, the voltage at the base of transistor 88 rises causing transistor 88 to turn on and transistor 90 to turn off. The collector voltage of transistor 90 thus goes more positive, thereby cutting off PNP transistor 92. At this time, current from transistor 92 to the capacitor 94 is substantially zero, and capacitor 94 discharges through transistor 78 and transistor 88. The current to transistor 78 is much greater than current to the base of transistor 88, so that the voltage at the base of transistor 88 decreases to turn the transistor 88 off, causing transistor 90 to turn on thereby completing the trigger cycle.

In effect, transistor 78 operates as a current source that is modulated by the DC control voltage. The current source transistor 78 charges the capacitor 94, and thus the rate of change of voltage across the capacitor 94 is dependent on the current output of transistor 78. By modulating the current source, the output frequency is directly modulated.

The frequency of the phase-locked oscillator is established by the time of charging and discharging of the capacitor 94 which, in turn, is determined by the flow of current to the collector of transistor 78. If the control voltage 68 to the terminal 40 is increased, then the base voltage of transistor 78 rises so that collector current is increased. Thus, the capacitor 94 discharges faster, resulting in an increase in the frequency of the VCO 34. On the other hand, a decrease in control voltage 68 results in a corresponding decrease in VCO frequency.

A constant current source 96 includes a transistor 98 having its collector connected to the common emitter circuit of transistors 88 and 90 of the Schmitt trigger 86, and its base connected to a diode 100 and grounded resistor 102. The base circuit of transistor 98 is coupled through a resistor 104 to an RC network 106 that is tied between the collector circuit of transistor 88 and the base of transistor 90. The constant current source stabilizes the operation of transistor 90, maintains the voltage levels of the trigger 86 substantially constant, and controls the triggering action and speed of the Schmitt trigger 86.

In addition, a level detector 108 is coupled between the emitter of the PNP transistor 92 and the output or utilization circuit, which is the write driver 93 of the record circuit that energizes the selected magnetic head to register data bits on a selected disc under control of the pulses from the VCO 34. The level detector 108, which includes a pair of emitter-coupled NPN transistors 110 and 112 and an AC coupling capacitor 113, serves as a signal shaper and improves the sensitivity of the VCO 34, and increases the selectivity of the circuit at the frequency of operation.

In accordance with this invention, the data is received from a data processing unit, such as a computer for example, as a series of bits that are to be recorded at predetermined areas of selected tracks of a storage disc 24. The data bits are recorded under control of the output signal from the VCO 34, which serves as a clock. Since the frequency and phase of the VCO output is tied to the frequency and phase of the rotating discs 24 and the toothed wheel 20, the data bits are registered at uniformly spaced bit positions, i.e., at a constant density. In this manner, the necessity for a separate clock track or a self-clocking code is eliminated. This invention has been successfully embodied in a magnetic disc file utilizing NRZI modulation, with a write frequency of 13.5 MHz, and the VCO 34 operating at 6.75 MHz.

The novel system also allows precise location of a record or portion of data of a selected track for readout. A sensing transducer, which may be a magnetic sensor 114, that cooperates with a ferromagnetic pin 115 fixed on the toothed gear 20 (see FIG. 1) provides an indication of "Home" position. An index pulse is fed to a counter, which begins a count in response to pulses developed by the cogs 22 of the wheel 20, and by the phase locked oscillator. Thus, an accurate index is obtained of the precise angular position of the disc pack 10 and each disc 24. Disc speed variation will not affect correct record location since the phase lock oscillator compensates for any spurious changes in speed.

In effect, the phase of the oscillator circuit is locked to the phase of the rotating disc means. Any difference in angular velocity of the disc means varies the frequency of the oscillator accordingly. The oscillator is useful for enabling readout of the data bits at their exact recorded positions, as well as serving to control the clocking of the write signal during the record mode.

In an embodiment of this invention, the following values were used for the circuit components, the resistance values being given in ohms unless designated otherwise:

Resistance 58—3.6 kilohms.
Resistance 60—4.3 kilohms.
Capacitor 64—0.47 microfarads.
Capacitor 66—5.6 microfarads.
Resistance 74—300.
Resistance 84—510.
Capacitor 94—240 picofarads.
Resistance 102—301.
Resistance 104—909.
Capacitor 113—0.01 microfarads.
Resistance 116—300.
Resistance 118—100.
Resistance 120—300.
Resistance 122—909.
Resistance 124—500.
Resistance 126—100.
Resistance 128—301.
Resistance 130—340.
Capacitor 132—33 picofarads.
Resistance 134—75.
Capacitor 136—0.01 microfarads.
Resistance 138—430.
Resistance 140—150.
Resistance 142-430.
Resistance 144—360.
Resistance 146—301.
Resistance 148—300.

While the invention has been particularly shown and described with reference to a preferred embodiment thereof, it will be understood by those skilled in the art that the foregoing and other changes in form and details may be made therein without departing from the spirit and scope of the invention.

We claim:

1. A data storage system comprising:

a spindle;

a storage means having a plurality of magnetic discs mounted coaxially on said spindle for simultaneous rotation;

a recording means for recording a constant number of data bits along at least one closed track on said magnetic disc;

a signal-generating mans mounted to said spindle for generating a reference signal representative of the angular velocity and phase of said storage means;

a voltage-controlled oscillator having an output frequency for controlling said recording means; and a control means for receiving said reference signal from said first means and connected to said voltage-controlled oscillator for controlling the frequency of said output frequency of said voltage-controlled oscillator as a function of said reference signal where the ratio of said output frequency to said reference signal is maintained at a constant value greater than 1, and said second means phase locks said output frequency of said voltage controlled oscillator to said reference signal, said output frequency of said voltage-controlled oscillator controlling the recording and registration by said recording means of said constant number of data bits in a proper phase relation along said closed track regardless of variations in said angular velocity of said storage means.

2. A data storage system as in claim 1 wherein said signal-generating means includes a toothed wheel mounted to said spindle.

3. A data storage system as in claim 2 including index means mounted to said toothed wheel, and a sensing transducer cooperating with said index means for sensing home position of said storage means to provide an index for counting the constant density data bits during the readout mode.

4. A data storage system as in claim 2, including a fixed sensing element disposed adjacent to said wheel for sensing each tooth that traverses such sensing element, and for producing a pulse signal in response to the sensing of said teeth.

5. A data storage system as in claim 4, including a phase discriminator for receiving said pulse signal and the output signal from said voltage-controlled oscillator to produce a phase error signal.

6. A data storage system as in claim 5, including compensation and integration means for averaging said phase error signal, whereby said oscillator system is stabilized for jitter.

7. A data storage system as in claim 5, including a counter-divider coupled to the output circuit of said voltage-controlled oscillator for changing the frequency of said oscillator to the frequency of the reference signal generated by said means mechanically connected to said storage means.

8. A data storage system as in claim 5, including means for transforming such phase error signal to a control voltage for application to said voltage-controlled oscillator.

9. A data storage system as in claim 8, wherein said voltage-controlled oscillator includes a Schmitt trigger responsive to said control voltage.